Feb. 18, 1941.                S. SCHUMANN                2,232,142
                               WOUND CLIP
                            Filed Sept. 27, 1940

INVENTOR.
SEYMOUR SCHUMANN,
BY

Patented Feb. 18, 1941

2,232,142

UNITED STATES PATENT OFFICE 2,232,142

WOUND CLIP

Seymour Schumann, New York, N. Y.

Application September 27, 1940, Serial No. 358,610

2 Claims. (Cl. 128—335)

This invention relates to surgical clips or clamps used as substitutes for or in association with sutures or stitches for clamping together until healed, wounds resulting from surgical operations.

Such wound clips or clamps usually consist of an arched member having a skin piercing prong at each end thereof. The surgeon bends the clip in place over the wound to cause the clips to pierce the skin on each side thereof and thus hold together the faces of the cut. Such current clips have several disadvantages, of which one is that the surgeon can never be sure that the clip will bend at its true center, or at the apex of the arch, and thus cause the prongs to pierce the skin in registering relationship and at the same angle. They must enter the skin at a certain angle to enter deep enough to hold fast without tearing out and yet not deep enough to enter that lower layer of skin wherein they would cause undesirable irritation and pain.

Another disadvantage is that the clamp lies so close to the wound that it cannot be unbent for removal from the patient's body without the use of a special tool and that, too, may be painful.

Therefore, an object of this invention is to devise a wound clip or clamp that overcomes these disadvantages and yet is otherwise satisfactory and cheap to manufacture. With these and other objectives in view, the invention may be said to involve a main arched portion of the clip provided at each end with a skin-piercing prong, this arched portion being made of relatively soft metal so as to be readily bendable into wound clamping position. By using relatively soft metal, this portion is cheap and easy to stamp out. The arched portion is provided with two similar but oppositely directed reinforcing members made of relatively hard or stiffer metal. They are saddle-like in shape and are disposed on the outer side of the arched portion and clamped thereto in carefully spaced relation so that their abutting ends are equally distant from the ends of the arched portion. The abutting ends of the saddle-like members are provided with bent-up tabs that extend substantially radially from the outer face of the arched portion, so that when the clip is bent into wound-clamping position they assume a V-shaped relation to each other. The centralized location of the saddle members assures that the arched portion, when bent into wound clamping position, will bend exactly at its center or apex, forming therefrom two legs of equal length with the result that the prongs will pierce the skin in registering relationship. By pressing the upstanding tabs together, which can be done with the fingers without any tool, the clip is readily unbent and removed from the wound, without causing the patient any substantial pain.

A preferred embodiment of my invention is illustrated by way of example, in the accompanying drawing, in which—

Fig. 4 is a bottom view of my finished clip looking upwardly at it from below, while

Figure 1:
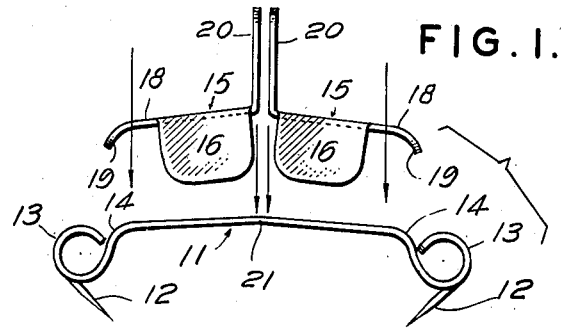
Figure 1 is a composite side elevational view of my clip separated into its component parts.

In the accompanying drawing, the reference numeral 11 is used to designate the main arched or arch-like body portion of the improved clip or clamp, provided at each end thereof an inwardly projecting skin-piercing prong 12. The arched portion 11 is usually provided with its ends curved back upon themselves to form cylindrical end members 13 from which the prongs 12 project. For strengthening purposes, I preferably provide shouldered sections 14 in the arched portion 11 adjacent to each cylindrical end member 13. This arched portion 11 is made of metal that is preferably rectangular in cross section and is soft enough to be bent easily by the operating surgeon without tools, when it is to be bent into wound-closing or clamping position.

The arched portion 11 is adapted to carry on the outer or upper face thereof, two oppositely directed but otherwise similar saddle-like reinforcing members 15 of relatively harder metal than the relatively softer metal of portion 11, and each having depending legs 16 and 17 that are adapted to be clamped around the arched portion 11, to hold the saddle members in place on the arched portion. The saddle members each also have a main body portion 18 that closely follows the contour of the arched portion 11 and each ends, at one end, preferably in a semicircular contour as at 19, and at the other end in an upset tab 20 that extends substantially radially from the saddle member 15 and the arched portion 11. The semicircular end 19 of the saddle members 15 is adapted to engage the cylindrical end member 13 that is adjacent thereto for thus assuring the equidistant spacing of the tab 20 of each saddle member 15 from the end of the arched portion, with the result that each tab 20 will lie one on each side of the middle or apex point 21 (indicated on the drawing) of the arched portion 11 which indeed may take the form of a scored line. The reinforced and improved wound clip or clamp is sold in the form shown in Fig. 1, whereas when it has been bent by the surgeon into wound-clamping position, the clip takes the form or shape shown in Fig. 6. In this latter position, it is to be noted that the arched portion 11 has been bent along line 21 that is located at the apex of the arched portion 11. This is for the purpose of having each leg of the reinforced clip, measuring from the apex line 21, be of equal length, whereby the prongs 12 pierce the skin while oppositely directed but otherwise at the same angle, and thus they are in alignment and in register. In this clamping position, the tabs 20 of the saddle members 15 assumed a substantially V-shaped relationship. When the surgeon desires to remove the clip, he has only to press with his fingers on the tabs 20 until the pressure on them is sufficient to open the arched portion 11 about as it was initially. The prongs 12 are retracted from the skin and the clip removed from the patient's body in which position the tabs 20 are in substantial abutment due to response to the clip parts to the opening pressure of the surgeon's fingers.

Figure 6:
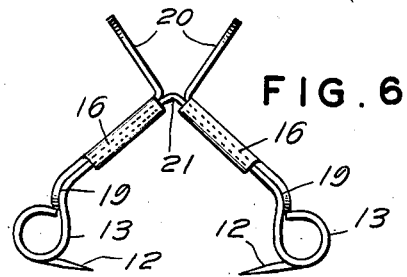
Fig. 6 is a side elevational view of my complete clip when in wound-clamping position.
Figure 2:
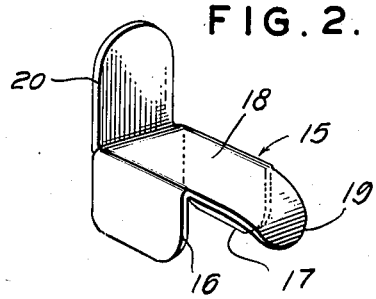
Fig. 2 is a perspective view of one of my saddle-like reinforcing members.
Figure 3:
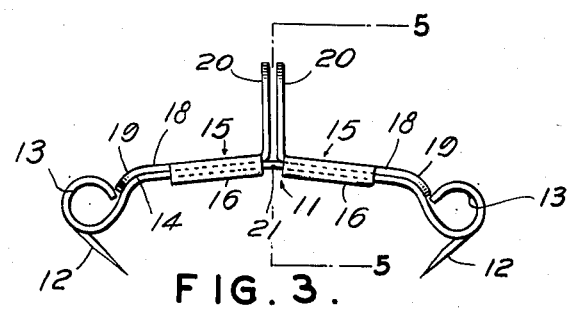
Fig. 3 is a side elevational view of my finished clip.
Figure 5:
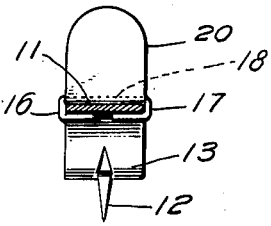
Fig. 5 is a vertical sectional view taken along the line 5—5 of Fig. 3.
Figure 4:
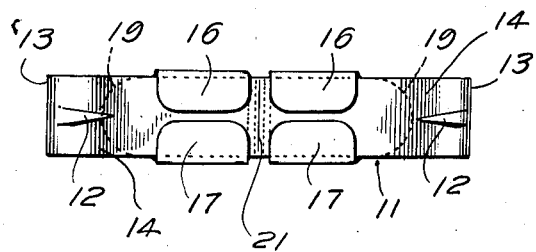

Since the clip of this invention can be used over again, the tabs 20 may get bent so that they toe in, instead of being parallel as shown in Fig. 1, therefore, it may be desirable to have the tabs, instead of being so parallel, to toe outwardly to some extent, somewhat after the fashion of their relative angularity in Fig. 6. It may also be desirable, for these reasons, instead of having the tabs abut, to have the adjacent ends of the saddle members 15 abut to assure their careful spacing on each side of the apex line 21 of the arched portion. Also, it is conceivable that the saddle or reinforcing members 15 may be riveted or welded to the arched portion 11, rather than clamped thereto, if occasion demanded it.

I claim:

1. A wound clip having an arched main body portion provided with a skin-piercing prong at each end thereof, and two similar but oppositely directed reinforcing members disposed onto the outer side of the arched portion and clamped therearound, said members having abutting tabs extending substantially radially outwardly from the arch and equally spaced from the ends of the arched portion whereby when the clip is bent into clamping position the arch is caused to bend from its center with the result that the tabs assume a substantially V-shaped relation and the prongs assuredly enter the skin in registering relationship and thereafter squeezing of the tabs together unbends the arched portion for thus retracting the prongs from skin piercing position.

2. A wound clip comprising a curved arch-like main wound closing relatively soft and manually bendable metal body rectangular in cross-section having its free ends bent upwardly back upon themselves to form at each end of the body a substantially cylindrical portion, a skin-piercing prong projecting inwardly from each cylindrical portion, and two reinforcing oppositely directed relatively stiff metal saddle-like means disposed on top of the body, each of said means comprising a main body portion having an upset portion at one end and a clamping portion depending from each side adapted to be clamped around the clip body for holding the saddles in place with the upset portions in abutting relationship and equally spaced from the cylindrical ends of the clip body, said upset portions being adapted to be squeezed together for thereby unbending and thus removing the clip from wound closing position.

SEYMOUR SCHUMANN.